United States Patent
Boardman et al.

(12)

(10) Patent No.: US 6,657,357 B2
(45) Date of Patent: Dec. 2, 2003

(54) LOW PRESSURE DROP LATTICE AREA REINFORCEMENT FOR SECTION PLATE SUPPORT FOR CORES OF GENERATORS

(75) Inventors: William Hunter Boardman, Burnt Hills, NY (US); Richard Nils Dawson, Voorheesville, NY (US); Donald Michael Ronca, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 208 days.

(21) Appl. No.: 09/863,019

(22) Filed: May 23, 2001

(65) Prior Publication Data

US 2002/0175576 A1 Nov. 28, 2002

(51) Int. Cl.⁷ .............................. H02K 5/04; H02K 9/08
(52) U.S. Cl. ..................... 310/258; 310/52; 310/58; 310/89
(58) Field of Search ........................ 310/258, 89, 52, 310/58, 59

(56) References Cited

U.S. PATENT DOCUMENTS

| 2,210,686 | A | * | 8/1940 | Ross ........................... 310/258 |
| 2,818,515 | A | * | 12/1957 | Dolenc ......................... 310/57 |
| 3,531,667 | A | * | 9/1970 | Barton et al. ................ 310/51 |
| 4,593,223 | A | * | 6/1986 | Lehoczky .................... 310/258 |
| 4,912,350 | A | * | 3/1990 | Parshall et al. ............. 310/217 |
| 5,019,737 | A | * | 5/1991 | Bruno .......................... 310/89 |
| 5,767,602 | A | * | 6/1998 | Sargeant ..................... 310/258 |
| 5,796,191 | A | * | 8/1998 | Schwanda .................... 310/58 |

* cited by examiner

Primary Examiner—Burton Mullins
(74) Attorney, Agent, or Firm—Nixon & Vanderhye

(57) ABSTRACT

Section plates in a generator frame are spaced longitudinally or axially one from the other and have ventilation openings for flowing a cooling gas. The ventilation openings comprise in each section plate a plurality of alternating right-side-up and upside-down triangles extending across the bottom of the section plate. The bases of the triangular openings are formed by the housing or wrapper plate enabling free flow unbounded by additional ligaments through the openings in the section plate, reducing the pressure drop and windage losses, while increasing machine efficiency.

10 Claims, 3 Drawing Sheets

LOW PRESSURE DROP LATTICE AREA REINFORCEMENT FOR SECTION PLATE SUPPORT FOR CORES OF GENERATORS

BACKGROUND OF THE INVENTION

The present invention relates to generators for producing electricity and particularly relates to support plates for the core of the generator having low pressure drop lattice areas to facilitate flow of cooling gas along and through the generator.

In electrical machinery and particularly generators, a pressurized forced gas cooling system, for example, employing air or hydrogen, is frequently used to cool the machinery. The cooling gas must pass through structural elements of the generator supporting the core. Particularly, in generators, section plates, i.e., reinforcing plates, extend generally transversely of the machine axis at axially spaced locations from one another. Openings are formed through the section plates for the transmission of the cooling gas, typically from one end of the generator to its opposite end. Because of cost, shipping and other constraints, the generator/motor supporting frame must be compact and robust. This leaves only very limited space for transmission of the cooling gas throughout the machinery. Cutouts are often provided in the generator support section plates to facilitate transmission of the cooling gas longitudinally along the machinery. Ventilation cutouts, however, reduce the stiffness of the section plates and can result in structural vibration problems. While a tradeoff between affording adequate ventilation through the generator and avoidance of structural and vibration problems is always encountered during frame/ventilation design, the designs often also result in a larger than desired pressure drop of the cooling gas flowing through structural components which do not require cooling, i.e., the non-heat-generating components. These frame pressure drops increase the overall machine ventilation pressure drop, resulting in increased fan head and flow requirements which, in turn, increase windage losses and reduces machine efficiency.

Prior section plate cutouts for flowing the cooling gas have been typically provided as lattice areas formed internal to the section plates. That is, the lattice areas are not bounded by any part other than margins of the openings found in the section plates per se. It will be appreciated that full continuous welds are typically provided between the section plates and the wrapper, i.e., the housing. Typical design practice has been to maintain a substantial separation between the lattice area and the wrapper to provide structural support and facilitate welding between the wrapper and the section plates. In such prior section plates, the lattice area is typically comprised of an array of generally rectilinear and triangularly-shaped openings spaced above the bottom plate of the wrapper by a ligament extending transversely between opposite sides of the generator. Even in those section plates having curved peripheral edges, the lattice area is spaced back from the surrounding wrapper by an arcuate ligament. Analysis has demonstrated that these section plates with lattice area geometries such as described above result in a bending mode of vibration close to twice the running frequency. It will be appreciated that the bottom plate of the wrapper is typically spaced from any floor support by pads along sides and corners of the machinery and significant adverse vibration occurs during operation of the machine. Accordingly, there is a need for an improved structural support accommodating the needs for transmission of cooling flow, as well as structural requirements with reduced vibration.

BRIEF SUMMARY OF THE INVENTION

In accordance with a preferred embodiment of the present invention, there is provided a generator supporting frame structure having a plurality of axially spaced section plates which reduce the ventilation pressure drop through the section plates upon flowing cooling gas, increase the bottom plate bending frequency, reduce the flow coefficient by the elimination of the transverse ligament thereby removing it as an impediment to flow, reduce costs by minimizing the welding required between the section plates and the wrapper and enable reduction of the wall thickness of the bottom plate. To accomplish the foregoing, a plurality of, preferably three, axially extending ribs are provided along the bottom plate of the wrapper. Section plates are also provided at longitudinally spaced positions along the machinery. The section plates have a lattice area formed of a plurality of generally triangularly-shaped openings having transversely alternating apices and bases of the triangular-shaped openings adjacent the bottom plate. With this arrangement, the openings having their bases adjacent the bottom plate also receive axially extending support ribs. The adjacent triangular-shaped openings having their apices adjacent the bottom plate are welded to the bottom plate. The lattice area does not contain any ligament between the truss elements forming a lattice along the bottom plate apart from the apices bounding certain of the triangularly-shaped openings.

By the foregoing construction, gas flow pressure drop through the section plates is substantially reduced by two mechanisms: first, the cross-sectional flow area of the triangularly-shaped cutouts is larger than those openings of the prior art sectional plates and, secondly, the restriction at the interface between the bottom plate and the sectional plates, i.e., the transversely extending ligament, is eliminated, reducing the flow coefficient by a substantial margin. This also facilitates construction of the generator frame by reducing the magnitude of the welding required between the sectional plates and the bottom plate. By lowering the pressure drop, the bottom plate bending mode is moved away from the forcing frequency and the static stress due to internal pressure is lowered.

In a preferred embodiment according to the present invention, there is provided a generator frame comprising a plurality of section plates axially spaced from one another for supporting a core of the generator, a housing about marginal portions of the section plates extending in a direction generally perpendicular to the section plates and including a wall plate, the section plates having a lattice area adjacent the wall plate defined by a plurality of openings through the section plates for flowing gases along and within the generator through the section plates, at least one of said openings through one of the section plates being handled in part by the wall plate.

In a further preferred embodiment according to the present invention, there is provided a generator frame comprising a plurality of section plates axially spaced from one another for supporting a core of the generator, a housing about marginal portions of the sectional plates extending in a direction generally perpendicular to the sectional plates and including a bottom plate, the sectional plates having a plurality of openings through the section plates for flowing gases along and within the generator through the section plates, at least one of the openings through one of the section plates being bounded in part by the bottom plate such that the one opening lies unobstructed in an axial direction by any portion of the one section plate adjacent the bottom plate.

DETAILED DESCRIPTION OF THE INVENTION

Figure 1:
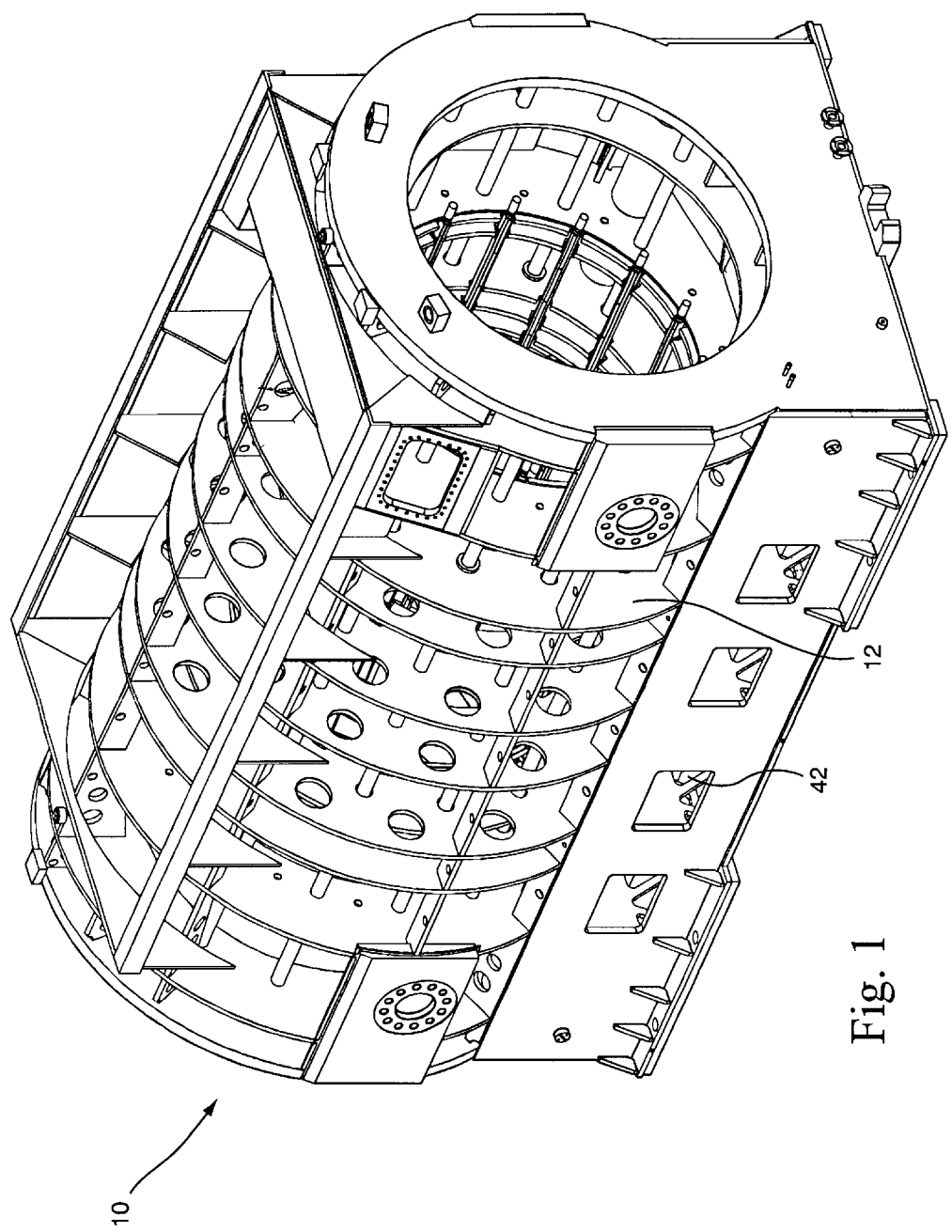
FIG. 1 is a perspective view of a stator frame of a generator incorporating a preferred embodiment of the present invention.
Figure 4:
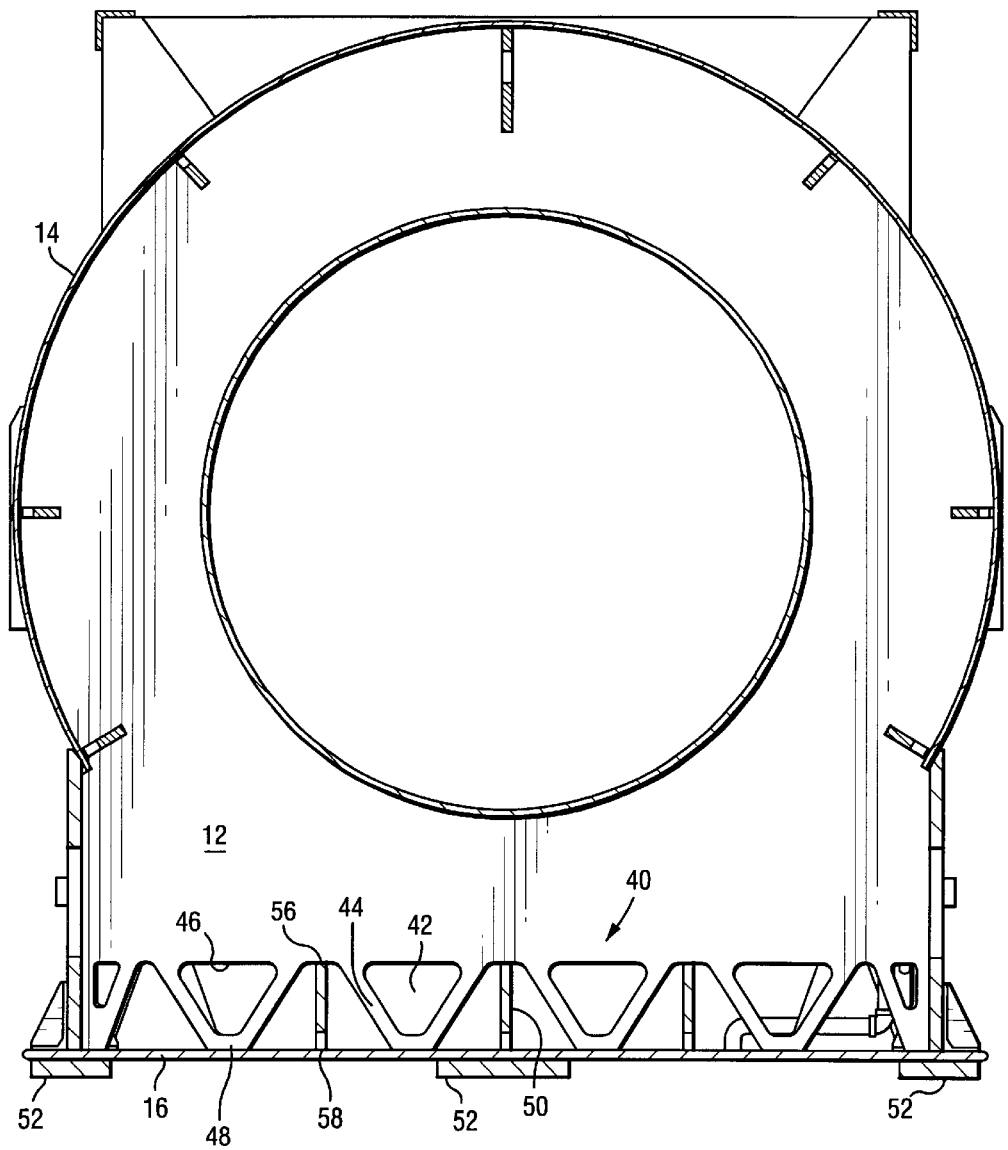
FIG. 4 is an enlarged end elevational view of a section plate incorporating a low pressure drop lattice area reinforcement for the flat plate support according to a preferred embodiment of the present invention.

Referring now to FIG. 1, there is illustrated a stator frame forming part of a generator. The stator frame, generally designated 10, comprises a plurality of section plates 12 longitudinally or axially spaced one from the other. Section plates 12 support the spring bar system, which in turn supports key bars and the core of the generator and also provides pressure support for the wrapper or housing about the stator frame. The housing, for example, as illustrated in FIG. 4, may comprise the outer shell of the generator including an arcuate wall plate 14 and a bottom plate 16, hereafter sometimes individually referred to as a wall plate. It will be appreciated that in final construction, the housing or wrapper extends about the section plates and defines within the housing or wrapper a pressurized gas cooling system, such that cooling gas, for example, hydrogen, may flow through the section plates as required to transport the gas to and from heat generating components, the cooling fans, and coolers.

Figure 2:
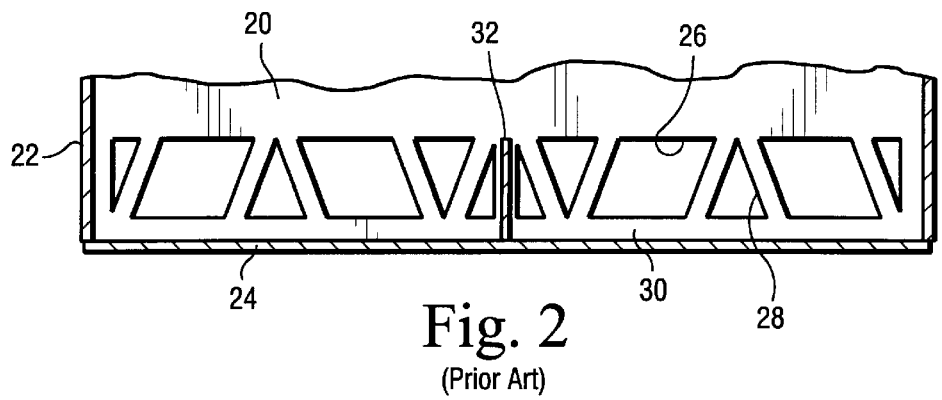
FIG. 2 is a fragmentary cross-sectional view of a prior section plate having ventilation openings.
Figure 3:
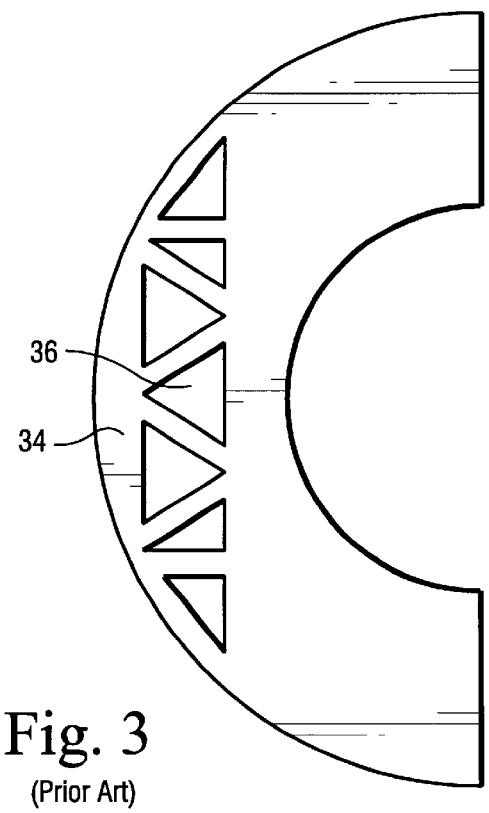
FIG. 3 is a fragmentary end elevational view of a different type of section plate having ventilation openings.

As illustrated in FIG. 2, conventional section plates 20 surrounded by a housing or wrapper 22 typically have lattice areas adjacent the bottom plate 24 for flowing cooling gases. These lattice areas typically take the form of a series of rectilinear and triangularly-shaped openings 26 and 28, respectively, to enable passage of the cooling gas through a section plate. However, the cooling gas passing through the ventilation openings 26 and 28 encounters significant pressure drops which increase the overall machine ventilation pressure drop, thereby increasing fan head and flow requirements, which in turn increase windage losses and reduces machine efficiency. These pressure drops are in part caused by the separation between the lattice ventilation openings 26 and 28 and the housing 22 by a ligament 30 which has a substantial width. Note also the continuous weld that is necessary between the section plate 20 and the bottom plate 24 along the entire length of the ligament 30 in the transverse direction of the section plate 20. With only a single longitudinally extending rib 32 extending through the section plate, the ventilation openings cause a reduction in section plate stiffness, which can result in vibration problems. In FIG. 3, the ventilation cutouts are formed in the arcuate section of the section plates and similar problems arise in that configuration, particularly with respect to the ligament 34, which extends between the triangularly-shaped ventilation cutouts 36 and the margin of the section plate. The present invention eliminates the pressure-forming constriction between the section plate and the pressure boundary plate, i.e., the housing wrapper, which not only reduces ventilation pressure drop across the section plate but also increases the pressure retaining capacity of the wrapper and reduces welding between the section plates and wrapper.

Referring now to FIG. 4, there is illustrated a typical section plate 12 among the various longitudinally or axially spaced section plates of the generator frame illustrated in FIG. 1. The wrapper or housing 14 includes the lower pressure boundary or bottom plate 16. In this preferred embodiment of the present invention, the section plate is provided with a lattice area, generally designated 40, adjacent bottom plate 16 defined by a plurality of openings 42 for flowing the cooling gases through the section, i.e., longitudinally through the generator frame. The lattice openings 42 are in the form of a truss forming generally triangularly-shaped openings spaced one from the other across the transverse width of the section plate. The triangularly-shaped openings 42 have bases and apices which alternate in the plane of the section plate adjacent the bottom wall plate 16, leaving angled ligaments 44 between the openings 42. That is, the base 46 of one opening is spaced from the bottom plate 16, while the apex 48 at the juncture of the ligaments 44 forming the triangular opening engages the bottom plate 16. The next transversely adjacent opening has the apex 48 spaced vertically from the base of the triangularly-shaped opening. Thus, the apices and bases of the triangularly-shaped openings alternate in a transverse direction across the section plate.

It will be appreciated from a review of FIG. 4 that alternate triangularly-shaped openings are bounded at their bases by the bottom plate 16 without any ligament interposed between the bottom plate 16 and the opening per se. That is, the triangularly-shaped openings having bases adjacent the bottom plate 16 are bounded in part by the bottom plate 16 such that the opening lies unobstructed in an axial direction by any portion of the section plate 12 adjacent the wall plate 16. Thus, alternate openings 42 are bounded by two ligaments 44 and the bottom plate, enabling flow of cooling gas through the openings with reduced pressure drop.

Also as illustrated in FIG. 4, a plurality of longitudinally extending reinforcing ribs 50 are disposed at laterally spaced positions from one another. The ribs provide support for the section plates. The ribs 50 preferably are disposed to pass through the triangularly-shaped openings which are in part bounded by the wall plate 16. The upper and lower edges 56 and 58 of the ribs 50 engage the section plates at the apices and bases of the right side triangular openings. The edges 58 particularly engage substantially medially of the bases of the openings. In this manner, there is no additional obstruction to the flow of cooling gas longitudinally of the generator frame.

From a review of FIG. 4, it will also be appreciated that not only is the ventilation pressure drop reduced by the foregoing described lattice area through the section plates but also fabrication costs are reduced. By locating only the apices of the ligaments defining the triangularly-shaped openings adjacent the bottom wall plate, the weld between the section plate and bottom wall plate is reduced. Also, the thickness of the bottom plate can likewise be reduced with the lattice area and longitudinal rib arrangement. Note that the bottom plate 16 is spaced from a floor or ground level by support pads 52. This arrangement of lattice, ventilation openings, longitudinally extending ribs and reduced bottom plate increases the bottom plate bending frequency. It will be appreciated that a similar arrangement as illustrated in FIG. 4 may be employed along an arcuate edge of a section plate, if desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator frame comprising:

a plurality of section plates axially spaced from one another for supporting a core of the generator;

a housing about marginal portions of said section plates extending in a direction generally perpendicular to the section plates and including a wall plate;

said section plates having a lattice area adjacent said wall plate defined by a plurality of generally triangularly-shaped openings in the section plates for flowing gases along and within the generator through the section plates;

at least one of said openings through one of the section plates being bounded in part by the wall plate; and said plurality of openings being arranged such that apices and bases of the triangularly-shaped openings alternate in the plane of the one section plate adjacent said wall plate, leaving angled ligaments of said one section plate between the openings.

2. A generator frame comprising:

a plurality of section plates axially spaced from one another for supporting a core of the generator;

a housing about marginal portions of said section plates extending in a direction generally perpendicular to the section plates and defining a pressurized gas cooling volume within the housing, said housing including a wall plate having a flat horizontal base plate forming part of a pressure boundary for the housing;

said section plates having a lattice area adjacent said wall plate defined by a plurality of openings in the section plates for flowing gases along and within the generator through the section plates;

said plurality of openings in said section plates bounded in part by said base plate; and a plurality of laterally spaced ribs extending axially through said openings for supporting said section plates and connected to the base plate.

3. A generator frame comprising:

a plurality of section plates axially spaced from one another for supporting a core of the generator;

a housing about marginal portions of said section plates extending in a direction generally perpendicular to the section plates and including a wall plate;

said section plates having a lattice area adjacent said wall plate defined by a plurality of generally triangularly-shaped openings in the section plates for flowing gases along and within the generator through the section plates;

at least one of said openings through one of the section plates being bounded in part by the wall plate; and said plurality of openings being arranged such that apices and bases of the triangularly-shaped openings alternate in the plane of the one section plate adjacent said wall plate, leaving angled ligaments of said one section plate between the openings, said plurality of openings in the one section plate being bounded in part by the wall plate such that said plurality of openings lies unobstructed in an axial direction by any portion of the one section plate adjacent and perpendicular to said wall plate, and a plurality of laterally spaced, axially extending ribs extending between said openings and through the triangular openings having bases adjacent said wall plate.

4. A generator frame according to claim 3 wherein certain of said angled ligaments join one another adjacent apices of said openings and lie adjacent said wall plate, the apices of said certain ligaments being secured to said wall plate.

5. A generator frame according to claim 3 wherein said ribs extend generally normal to said section plates and have opposite marginal edges engaging said section plates adjacent apices thereof and said wall plate substantially medially along the bases of the openings bounded by the wall plate.

6. A generator frame according to claim 5 wherein certain of said angled ligaments join one another adjacent apices of said openings and lie adjacent said wall plate, the apices of said certain ligaments being secured to said wall plate.

7. A generator frame comprising:

a plurality of section plates axially spaced from one another for supporting a core of the generator;

a housing about marginal portions of said sectional plates extending in a direction generally perpendicular to the sectional plates and including a bottom plate;

said sectional plates having a plurality of generally triangularly-shaped openings through the section plates for flowing gases along and within the generator through the section plates;

at least one of said openings through one of the section plates being bounded in part by the bottom plate such that said one opening lies unobstructed in an axial direction by any portion of the one section plate adjacent said bottom plate; and said plurality of openings being arranged such that apices and bases of the triangularly-shaped openings alternate in the plane of the one section plate adjacent said bottom plate, leaving angled ligaments of said one section plate between the openings.

8. A generator frame comprising:

a plurality of section plates axially spaced from one another for supporting a core of the generator;

a housing about marginal portions of said sectional plates extending in a direction generally perpendicular to the sectional plates and including a bottom plate;

said sectional plates having a plurality of generally triangularly-shaped openings through the section plates for flowing gases along and within the generator through the section plates;

at least one of said openings through one of the section plates being bounded in part by the bottom plate such that said one opening lies unobstructed in an axial direction by any portion of the one section plate adjacent said bottom plate; and said plurality of openings being arranged such that apices and bases of the triangularly-shaped openings alternate in the plane of the one section plate adjacent said bottom plate, leaving angled ligaments of said one section plate between the openings, said plurality of openings in the one section plate being bounded in part by the bottom plate such that said plurality of openings lies unobstructed in an axial direction by any portion of the one section plate adjacent said bottom plate, and a plurality of laterally spaced, axially extending ribs extending between said openings and through the triangular openings having bases adjacent said bottom plate.

9. A generator frame according to claim 8 wherein certain of said angled ligaments join one another adjacent apices of said openings and lie adjacent said bottom plate, the apices of said certain ligaments being secured to said wall plate.

10. A generator frame according to claim 8 wherein said ribs extend generally normal to said section plates.

* * * * *